Sept. 6, 1938.  F. W. SEVERIN  2,129,482
AUTOMATIC CONTROL
Filed Nov. 30, 1934  2 Sheets-Sheet 1
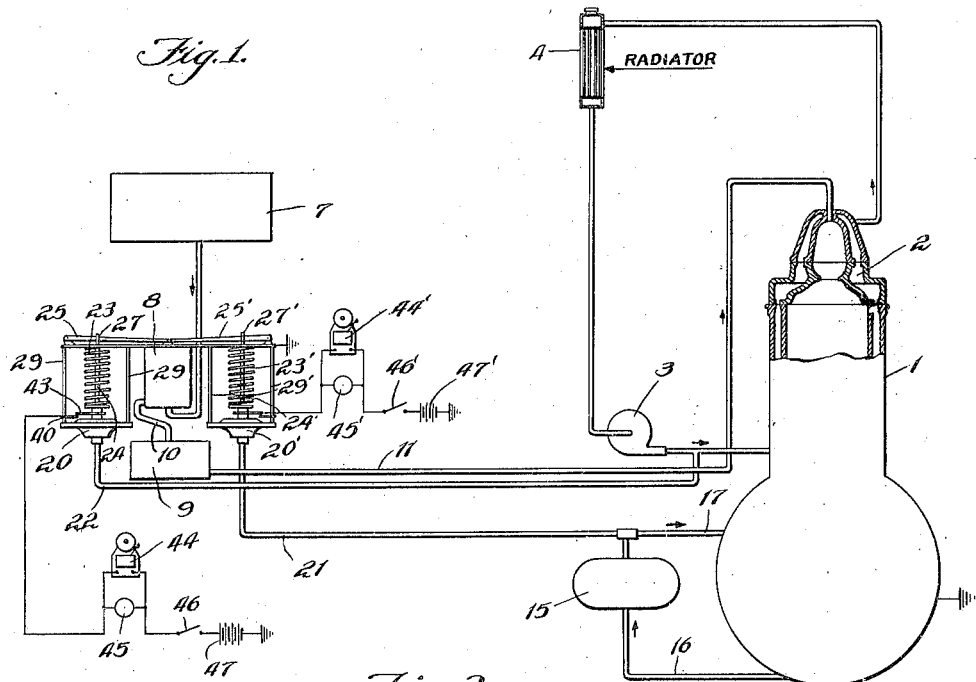
INVENTOR.
Frank W. Severin
BY Morris Spector
ATTORNEY.

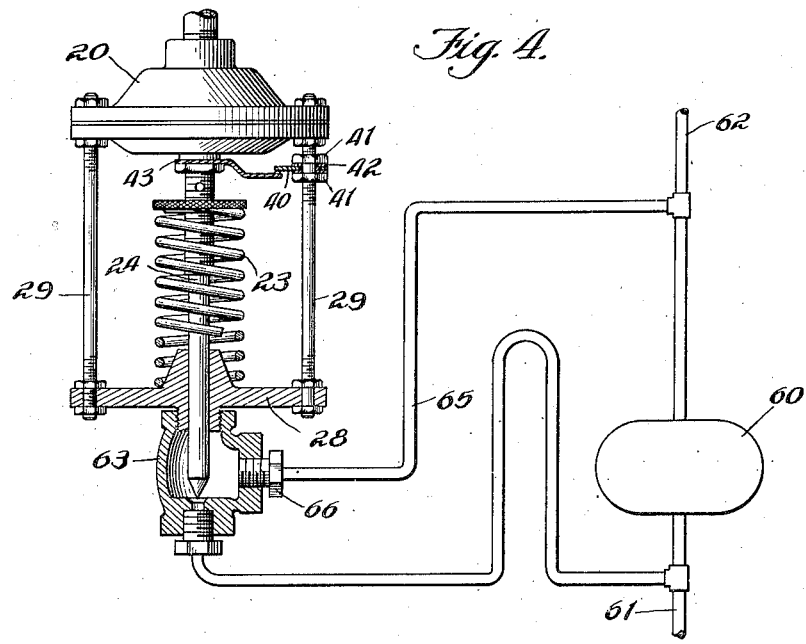
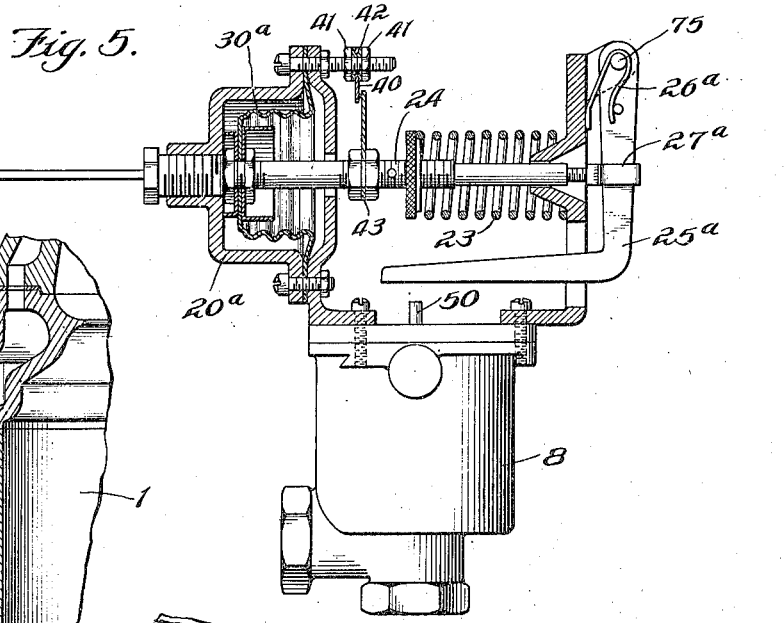
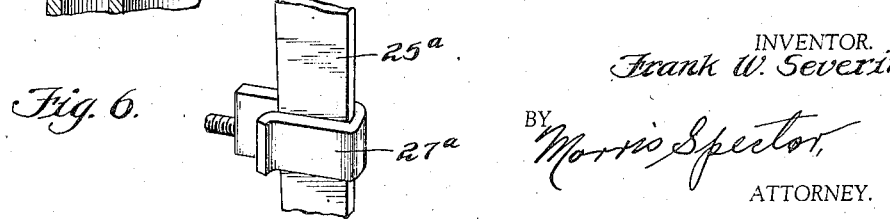

Patented Sept. 6, 1938

2,129,482

UNITED STATES PATENT OFFICE 2,129,482

AUTOMATIC CONTROL

Frank W. Severin, Evanston, Ill., assignor to Venn-Severin Machine Co., Chicago, Ill., a corporation of Illinois Application November 30, 1934, Serial No. 755,291

11 Claims. (Cl. 137—153)

This invention relates to control systems, and more particularly to such systems of control as are effective automatically in response to pressure differential changes. In its more particular aspects it is concerned with the automatic control of a valve in response to a change in pressure differential.

There are many instances where it is necessary, or desirable, that a given fluid pressure be maintained, and wherein a loss in pressure is indicative of a coming danger unless proper preventive steps are taken. By way of example, consider a mechanism which, in its normal operation, must be cooled by circulating around it a cooling fluid, such as water. The mechanism may be driven by power received from an external source, or it may be self-driven, as an engine. In either event, a failure of the cooling system does not necessarily result in the stopping of the mechanism and, as a consequence, may result in the overheating and perhaps destruction of the mechanism. It is one of the objects of the present invention to prevent such injury, and I accomplish this object by providing means for stopping the mechanism if the cooling system should fail.

In the present application I have shown my invention applied to an internal combustion engine of the Diesel type. This exemplifies only one embodiment of the invention, since the invention is not limited to Diesel engines in particular, nor to internal combustion engines in general, but is of broad application wherever a pressure differential may be utilized to perform a useful function. In the example here shown, the engine is water-cooled in the usual manner. Water must be circulated continuously, during the operation of the engine, to prevent overheating of the same. The water is circulated under a substantially fixed static head, which may be of widely different magnitudes in different installations. Should the circulating pump fail to operate, or should any other defect develop in the water circulating system, the static head pressure may remain, but the total pressure will drop below the value that should normally prevail in the particular system. This drop in pressure is utilized to control apparatus to stop the engine. I provide a differential pressure actuated diaphragm, one side of which is subjected to the pressure in the water system, and the other side of which is subjected to the pressure of a spring that is adjusted to a degree of tension such as is necessary to counteract the normal static head of the water. Should the static pressure drop below that for which the spring is set, the spring will move a member to effect a stopping of the engine.

The movement of the diaphragm may effect the desired results in any of a large number of ways. It may shut off the fuel supply to the fuel pump, or otherwise disable the fuel supply pump. In the case of an ignition engine (non-Diesel type) it may shut off the fuel flow to or from the carbureter, or it may shut off the ignition.

It is a further object of the present invention to provide a spring set differential pressure actuated apparatus with means for effecting a ready adjustment of the spring to counteract any desired static head. Such apparatus, by different adjustment, may be used on an installation where the static pressure head is less than, say, two pounds per square inch, or one wherein the static pressure head exceeds fifty pounds per square inch.

It is a still further object of the present invention to provide a differential pressure actuated apparatus which, although operating against large pressures, may effect delicate operations, such as, for instance, close a needle valve. I accomplish this result by providing a structure wherein the member that closes the needle valve under the control of the differential pressure apparatus is operated by its own spring, which may be a very light spring in comparison with the one that actuates the differential pressure apparatus.

It is a still further object of the present invention to provide a system for giving a signal, in the form of an alarm or the like, to indicate an abnormal condition of the operating mechanism, the signal to precede the actual stopping of the mechanism by a short time. The time between the giving of the signal and the actual stopping of the mechanism is so short that the mechanism cannot be injured by continued operation during that time, and yet long enough to permit an attendant, in many instances, to correct the abnormal condition before actual stopping of the mechanism is effected, thus avoiding stopping of the mechanism.

The attainment of the above and further objects of the present invention will be apparent from the following specification taken in conjunction with the accompanying drawings forming a part thereof.

In the drawings:

Figure 1 is a diagrammatic view of one form of control system embodying my invention;

Figure 2 is an enlarged view of a portion of the apparatus shown in Figure 1;

Figure 3 is a perspective view of one of the parts of the assembly shown in Figure 2;

Figure 4 shows an alternate method of control for stopping an engine;

Figure 5 shows the application of my invention for protection against abnormal temperatures instead of pressures; and Figure 6 is a fragmentary perspective of a portion of the apparatus of Figure 5.

Reference may now be had more particularly to Figure 1 wherein I have shown, in diagrammatic form, one embodiment of my invention. An internal combustion engine, of the "Diesel" type, is shown at 1, the engine being provided with a usual form of water cooling jacket 2, and a water circulating and cooling system comprising a water circulating pump 3, a radiator 4, and usual piping connections for circulating the water. The engine is also provided with a usual form of fuel feeding means comprising a fuel supply tank 7, a constant level float valve unit 8, and a fuel pump contained within a casing 9. The fuel pump receives liquid fuel by way of a pipe 10, and supplies fuel, under pressure, to the engine by way of a pipe 11. The engine is provided with a pressure lubricating system, the pressure being maintained by a pump 15 that draws in oil from the crank case by way of a pipe 16, and delivers it by way of a pipe 17, from which the lubricating oil, under pressure, ultimately goes to the bearings and other parts to be lubricated. This much of the power system is well known in the art and is shown merely to illustrate one typical power system to which the present invention is applicable. A description will now be given of the structure which I have added to this power system, and the manner in which the added structure influences this system, from which it will be apparent that my invention is applicable to other systems.

I provide means for stopping the engine responsive to the development of abnormal operating conditions. The abnormal conditions that are guarded against, in the illustration here shown, are (1) a failure of the cooling water circulating system, and, (2) a failure of the pressure lubricating system. Should either of these two systems fail to function properly, my apparatus will stop the engine. The apparatus for accomplishing this result comprises a pair of differential pressure actuated mechanisms 20 and 20', one of which is responsive to the pressure in the lubricating oil system, being connected to the high pressure side of the oil pump by a pipe 21, and the other of which is responsive to the pressure in the cooling water circulating system, being connected thereto by a pipe 22, and the arrangement is such that a certain operation of either one of the diaphragms will cause a shutting of the constant level valve 8.

The differential pressure actuated mechanisms and the apparatus directly controlled by them are shown more particularly in Figure 2. Since the two sets of structures are the same, a description of one will suffice also for the other. In the mechanism 20, the pressure of the fluid in the pipe 22 acts against a coiled spring 23 to move a rod 24, which, in turn, acts on a lever 25 to move it into an inoperative position and permit normal operation of the float valve 8. A light spring 26 biases the lever 25 to the position shown in the drawings, where it closes the float valve. The rod 24 acts against the lever 25 through a U-shaped saddle member 27, between the arms of which the lever 25 rests. The saddle is threaded into the rod, thus providing for adjustment of the effective length of the rod 24.

The mechanism 20 is supported from a plate 28 by a pair of bolts 29. The rod 24 is secured to the flexible diaphragm 30 in the usual manner, suitably sealed against the leakage of liquid. Stops 31—32 are provided to protect the flexible diaphragm against injury. A knurled nut 34 is threaded on the rod 24 and receives one end of the spring 23. The opposite end of the spring bears against the plate 28. By advancing or backing off the nut 34, the tension of the spring 23 may be adjusted within wide limits.

An electric contact spring 40 is held in adjusted position on one of the bolts 29 by a pair of nuts 41 and insulated from the bolt and the nuts 41 by suitable insulating washers 42. Co-operating with this contact spring is a movable contact spring 43 mounted on and movable with the rod 24, and not insulated therefrom. The two contact springs control an electric circuit including an audible alarm 44, and, if desired, also a visible signal 45. When the engine is in operation, a manual switch 46 is closed, thus placing the alarm circuit under the control of the diaphragm controlled contacts 40 and 43. One side of the battery 47 is grounded, as is also the engine and the apparatus associated therewith.

The tension of the spring 23 is adjusted, by adjusting the knurled nut 34, so that the effective spring force slightly exceeds the force on the diaphragm due to the normal static head of the water in the cooling system. When the pump 3 is in operation, the total fluid pressure on the diaphragm exceeds the spring pressure, and the diaphragm therefore forces the rod 24 outwardly, thereby raising the lever 25 to its inoperative position and permitting normal operation of the fuel supply constant level valve 8.

Should an abnormal condition develop which results in the stopping of the pump 3, or which, for any other reason, causes the pressure in the water cooling system to drop to the normal static pressure (or below), the spring 23 will force the diaphragm and the rod 24 back to the position shown in the drawings, thereby permitting the spring 26 to retract the lever 25 to the position shown in Figure 2. In this position, the lever 25 acts on a stem 50 of the valve 8, forcing that stem downwardly, to seat the valve needle 51 on the valve seat 52. This closes the valve needle 51 in the same manner that the float 53 might close it, and maintains the valve needle 51 closed independently of the float 53. Since the lever 25 which closes the needle valve is actuated by the spring 26, not by the rod 24, it is apparent that over-travel of the rod 24 in the valve closing direction cannot cause injury to the valve needle 51 or its seat 52. At no time is the valve stem 50 called upon to sustain the comparatively great force of the spring 23. Closure of the valve needle 51 stops the flow of fuel from the supply tank 7. The spring contacts also close the alarm circuit. The engine continues to operate, perhaps a minute or two, on the reserve fuel already in the float chamber of the valve unit 8 and in the fuel pump casing 9. This gives an attendant some time within which to correct the trouble, or the trouble may be of such a nature that it corrects itself in that interval. If the trouble persists, the engine will stop upon the consumption of the reserve fuel in the float chamber and in the fuel pump casing 9. If the trouble is cleared and the water pressure again rises to its minimum safe operating value before the fuel in the valve unit 8 has been consumed, the diaphragm actuates the rod 24 to raise the lever 25 out of engagement with the stem 50, and thus permit a resumption of normal fuel feeding even before the engine has stopped.

The mechanism 20' acts on the stem 50 in the same manner as does the mechanism 20, only it acts to shut off the fuel supply in response to a failure of the pressure in the forced oil lubricating system.

Insofar as the parts controlled by this mechanism are similar to those controlled by the mechanism 20, they have been indicated by corresponding reference numerals, primed.

From the above description, it is apparent that each of the differential pressure mechanisms 20 and 20' exercises control independently of the other, and either one of the mechanisms and their associated parts may be omitted without affecting the control that is exercised by the other.

In Figure 4 I have shown an arrangement wherein the pressure responsive unit stops the engine in a different manner. In this case the control is by disabling the fuel feed pump. At 60 I have shown, diagrammatically, a supply pump for supplying fuel, indirectly, to an engine of, say, the Diesel type. The pump 60, in its normal operation, draws in fuel from a supply tank (not shown) by way of an intake pipe 61, and delivers, by way of an outlet pipe 62, to, say, the small auxiliary tank that supplies oil to the high pressure injection pump of the Diesel engine. The differential pressure responsive device 20'' of Figure 4 is similar to the units 20 and 20' described above and includes a diaphragm to which is connected a valve 63, which opens or closes a by-pass around the pump 60. The engine is primed and started, in the usual manner. Under normal conditions the diaphragm of the unit 20'' then operates to close the valve 63. Thereafter the pump 60 operates in its usual manner, the by-pass around the pump being ineffective. Should an abnormal condition develop in the engine cooling water system, or in the forced lubricating system, depending upon which of the two systems the unit 20 is connected to, as illustrated in Figure 1, the resulting pressure differential will permit the spring to open the valve 63. The output side of the supply pump 60 is thus by-passed to the input side thereof, thereby preventing the pump 60 from supplying the fuel to the high pressure injection pump. After a short interval, the engine stops.

In Figure 5 I have shown an arrangement wherein the control of the engine is responsive to excessive temperature of the water cooling system, rather than in response to a loss in pressure. For the sake of illustration, I have here also shown that the differential diaphragm disc 30, of Figure 2, may be replaced by a bellows, here shown at 30a. The device 20a, which corresponds to the differential pressure device 20 of Figure 2, is a pressure responsive device, although it is here used to operate responsive to temperature changes. In this system a bulb 70, containing a suitable liquid, is immersed in the water jacket of the engine 1. The liquid is such that its boiling temperature is just in excess of the maximum safe operating temperature of the engine. As long as the engine temperature is not excessive, the bellows is in the position shown in Figure 5. A spring 26a urges the lever 25a in a counterclockwise direction about the pivot 75, that is, in a direction tending to depress the stem 50 and close the valve 8. When the rod 24 is in the position shown in the drawings, a U-shaped hook-like member 27a prevents outward movement of the lever 25a. Should the engine temperature become excessive, the liquid in the bulb 70 will boil, thus raising the pressure on the bellows, to collapse the bellows and force the rod 24 to the right, whereupon the U-shaped hook-like member 27a is moved to the right (as seen in Figure 5), thus permitting the spring 26a to actuate the lever 25a to press down on the valve stem 50 to shut off the fuel supply and stop the engine.

From Figure 5 it is apparent that the bellows may be used in place of the diaphragms 30 of Figures 2 and 4.

It is to be noted that in Figures 2 and 5, where the automatic apparatus serves to close a rather delicate needle valve, the actuation of the needle valve is by a rather light spring 26 or 26a, thereby preventing any violent impact on the needle valve. Also, should it be desired to continue operation of the engine after sounding of the alarm indicative of abnormal conditions, and before the engine has actually stopped, it is merely necessary to turn the needle valve operating lever 25 or 25a against the tension of the rather light spring 26 or 26a, not against the large force of the spring 23 or of the fluid pressure against the bellows.

From the above description it is apparent that the present invention is of general application, and is applicable to any operating mechanism wherein an abnormal condition can be detected by a pressure or temperature change, and wherein it is desirable to discover the abnormal condition and/or to stop the mechanism, or limit its operation, upon the occurrence of the abnormal condition.

In compliance with the requirements of the patent statutes, I have here shown and described a few preferred embodiments of my invention. It is, however, to be understood that the invention is not limited to these precise embodiments, the same being merely illustrative of the principles of the invention.

What I consider new, and desire to secure by Letters Patent, is:

1. In combination with a valve having a valve seat and a valve operator, a lever having abutting engagement with the valve operator so that movement of the lever in one direction closes the valve against its seat but movement in the opposite direction does not operate the valve, relatively light spring means acting through said lever to close said valve against its seat, a rod having abutting engagement with the lever so that movement of the rod in one direction moves the lever in its non-operating direction and movement of the rod in the opposite direction permits the spring biasing means to move the lever in its valve closing direction, fluid pressure means for moving the rod in one direction, and relatively heavy spring means acting against said fluid pressure means independently of the engagement of the lever with said valve for opposing the movement of said rod in said one direction and moving said lever out of abutting engagement with said valve operator.

2. In combination with an automatic valve including a valve chamber, a valve stem in the chamber and extending outwardly thereof, and automatic means in the chamber for closing and opening the valve; means outside of the chamber for closing the valve and disabling the automatic operation of the valve, comprising a movable member and spring means constantly urging said member to a position in abutment with the extended valve stem and urging the valve stem to the valve closed position, and means for moving said member away from the valve stem against the action of the spring means, said means for moving the member comprising movable means having abutting engagement with the movable member for moving said movable member in one direction out of abutment with the valve stem against the action of said spring means to permit automatic operation of the valve while movement of the movable means in the reverse direction permits the spring to move the movable member into actuating abutment with the valve stem, said movable means including pressure responsive means and a spring counteracting the normal pressure of the pressure responsive means.

3. In combination, a support, a pressure responsive device, means carrying said device on said support but spaced from the support on one side thereof, a rod actuated by the device and extending therefrom through the support to the other side thereof, a pressure counterbalancing spring between said device and the support and reacting against the latter, means on the rod constituting an adjustable seat for the spring, a lever pivoted on the support on said other side thereof, said rod having abutting engagement with the lever whereby the lever can be moved in one direction independently of the rod and spring and in the opposite direction under control of the rod, means for biasing said lever for movement towards said rod, and a device controlled by said lever.

4. The combination with an automatic valve unit having a valve seat, a valve movable into and out of engagement with the seat, and automatic mechanism for actuating the valve to its open and closed position, of means for moving the valve to its closed position and holding it there against the action of the automatic mechanism, said means comprising a lever having abutting engagement with the valve so that movement of the lever in one direction forces the valve against the seat and movement of the lever in the opposite direction restores the valve to the control of said automatic mechanism, means for moving the lever to force the valve against the seat, said last named means comprising a comparatively light spring urging said lever in its valve actuating direction and capable of exerting slightly greater force than said automatic mechanism whereby said spring can overcome the action of said automatic means and close said valve irrespective of said automatic means, and means for moving the lever in the opposite direction comprising power actuated counterbalanced means separate from the lever and having abutting engagement with the lever so that said power actuated means is movable out of engagement with said lever to permit the light spring to act against said valve and overcome said automatic means.

5. In combination with an automotive valve including a valve chamber, a valve stem in the chamber and extending outwardly thereof, and automatic means in the chamber for closing and opening the valve; means outside of the chamber for closing the valve and disabling the automatic operation of the valve, comprising a movable member and spring means constantly urging said member to a position in abutment with the extended valve stem and urging the valve stem to the valve closed position, and means for moving said member away from the valve stem against the action of the spring means, said means for moving the member comprising movable means having abutting engagement with the movable member for moving said movable member in one direction out of abutment with the valve stem against the action of said spring means to permit automatic operation of the valve while movement of the movable means in the reverse direction permits the spring to move the movable member into actuating abutment with the valve stem.

6. A differential pressure responsive device comprising a fluid pressure chamber, means including a diaphragm in said chamber and urged in one direction by the pressure therein, a member fixed to move with said diaphragm, spring means urging said member and diaphragm in the reverse direction, means acting between said spring means and said member for adjusting the force of the spring means to change the effective pressure at which the device is responsive, and alarm means connected with said member between said spring adjusting means and said diaphragm so as to be actuated by a given movement of the diaphragm independently of the position of said adjusting means.

7. In combination with a device having a valve casing and a valve therein, of a support detachably fixed to said casing and having a flanged opening therein, a pressure responsive unit fixed to said support in spaced relation with respect thereto, a rod extending through the opening in said support and operatively connected with said valve, means for operating said rod from said pressure responsive unit, and a counterbalancing spring for said unit surrounding and connected at one end to said rod, the other end of said counterbalancing spring being seated around the flange of said opening.

8. The combination with an operating unit including a valve having a stem, a valve seat for said valve, and means for moving said valve toward and away from its seat, of a support connected with said unit, a pair of levers pivoted to said support with their inner ends adjacent one another and both in abutting engagement with said stem independently of the other, relatively light spring means acting against said levers and arranged to act through either lever to overcome the valve moving means of said operating unit and shift said valve by virtue of the abutting engagement of the lever with said valve stem and to move said stem away from the other lever, and separate means associated respectively with said levers for governing the action of said spring means.

9. The combination with an operating unit including a valve having a stem, a valve seat for said valve, and means for moving said valve toward and away from its seat, of a support connected with said unit, a pair of levers pivoted to said support with their inner ends adjacent one another and both in abutting engagement with said stem independently of the other, and a pair of auxiliary controlling units, each including a light spring connected with the associated lever, each spring being adapted to overcome said valve moving means by virtue of said abutting engagement and to move said valve stem away from the other lever, and separate means for governing the action of said spring against said levers.

10. The combination with an operating unit including a valve having a stem, a valve seat for the valve, and means for moving said valve toward and away from its seat, of a support fixed to said unit, a pair of levers pivoted to said support with their inner ends adjacent one another and both in abutting engagement with said stem, a pair of diaphragm casings fixed to said support adjacent the outer ends of said levers, a diaphragm in each casing operatively connected to the associated lever at its outer end, and a relatively light spring anchored to each diaphragm casing and connected to the associated lever, said springs being adapted to be overcome by the pressure acting against said diaphragms but either being capable of exerting sufficient force to overcome said valve moving means when the pressure against the associated diaphragm is reduced.

11. In combination, a valve casing, a valve therein having a stem extending therefrom, a lever-supporting member fixed to said casing about said stem and having ends extending beyond the casing, a pair of levers pivoted to the extended portions of said member and having their inner ends in abutting engagement with said valve stem, a pair of controlling units mounted on said portions and each having an operating part arranged to actuate the associated lever, and a kerfed adjusting member threaded into each of said operating parts and adapted to transmit the movement of the associated operating part, the latter being received in the kerf of said adjusting member and serving thereby to prevent said adjusting part from rotating out of adjusting position.

FRANK W. SEVERIN.

CERTIFICATE OF CORRECTION.

Patent No. 2,129,482.　　　　　　　　　　　　　September 6, 1938.

FRANK W. SEVERIN.

It is hereby certified that error appears in the printed specification of the above numbered patent requiring correction as follows: Page 4, first column, line 63, claim 5, for the word "automotive" read automatic; page 5, second column, line 15, claim 11, for "adjusting" read adjusted; and that the said Letters Patent should be read with this correction therein that the same may conform to the record of the case in the Patent Office.

Signed and sealed this 11th day of October, A. D. 1938.

Henry Van Arsdale (Seal)　　　　　　　　　　　　　　　　　　Acting Commissioner of Patents.